United States Patent
Rau

[15] 3,636,796
[45] Jan. 25, 1972

[54] CHANGE-SPEED DRIVE AXLE

[72] Inventor: John C. Rau, Southfield, Mich.
[73] Assignee: General Motors Corporation, Detroit, Mich.
[22] Filed: Dec. 18, 1969
[21] Appl. No.: 886,108

[52] U.S. Cl. .................................................. 74/700, 74/358
[51] Int. Cl. ................................... F16h 37/08, F16h 3/08
[58] Field of Search ........................... 74/694, 700, 701, 358

[56] References Cited

UNITED STATES PATENTS

| | | | |
|---|---|---|---|
| 1,968,527 | 7/1934 | Kummich | 74/358 X |
| 2,180,962 | 11/1939 | Ormsby | 74/700 |
| 2,241,606 | 5/1941 | Kysor | 74/700 |
| 2,399,201 | 4/1946 | Buckendale et al. | 74/700 X |
| 2,415,758 | 2/1947 | Peterson et al. | 74/700 X |
| 2,465,832 | 3/1949 | Banker | 74/701 |
| 2,791,912 | 5/1957 | Bixby | 74/700 UX |
| 3,451,285 | 6/1969 | Synder | 74/359 X |

FOREIGN PATENTS OR APPLICATIONS

| | | | |
|---|---|---|---|
| 541,888 | 1/1932 | Germany | 74/358 |
| 723,760 | 4/1932 | France | 74/358 |

Primary Examiner—Arthur T. McKeon
Attorney—W. E. Finken, A. M. Heiter and Charles R. White

[57] ABSTRACT

Drive axle having first and second countershaft mounted gears which mesh respectively with an input driven gear and with a gear secured to the pinion shaft drivingly connected to the axle shafts through differential gearing. For direct drive the input is connected directly to the pinion shaft by the engagement of a first clutch; a lever operable in response to engagement of the first clutch disengages a second clutch to prevent power flow through the meshing gears and the countershaft. For speed change the first clutch is disengaged and the lever effects engagement of the second clutch so that power flow is through the countershaft and the gearing provides for the geared ratio change.

5 Claims, 2 Drawing Figures

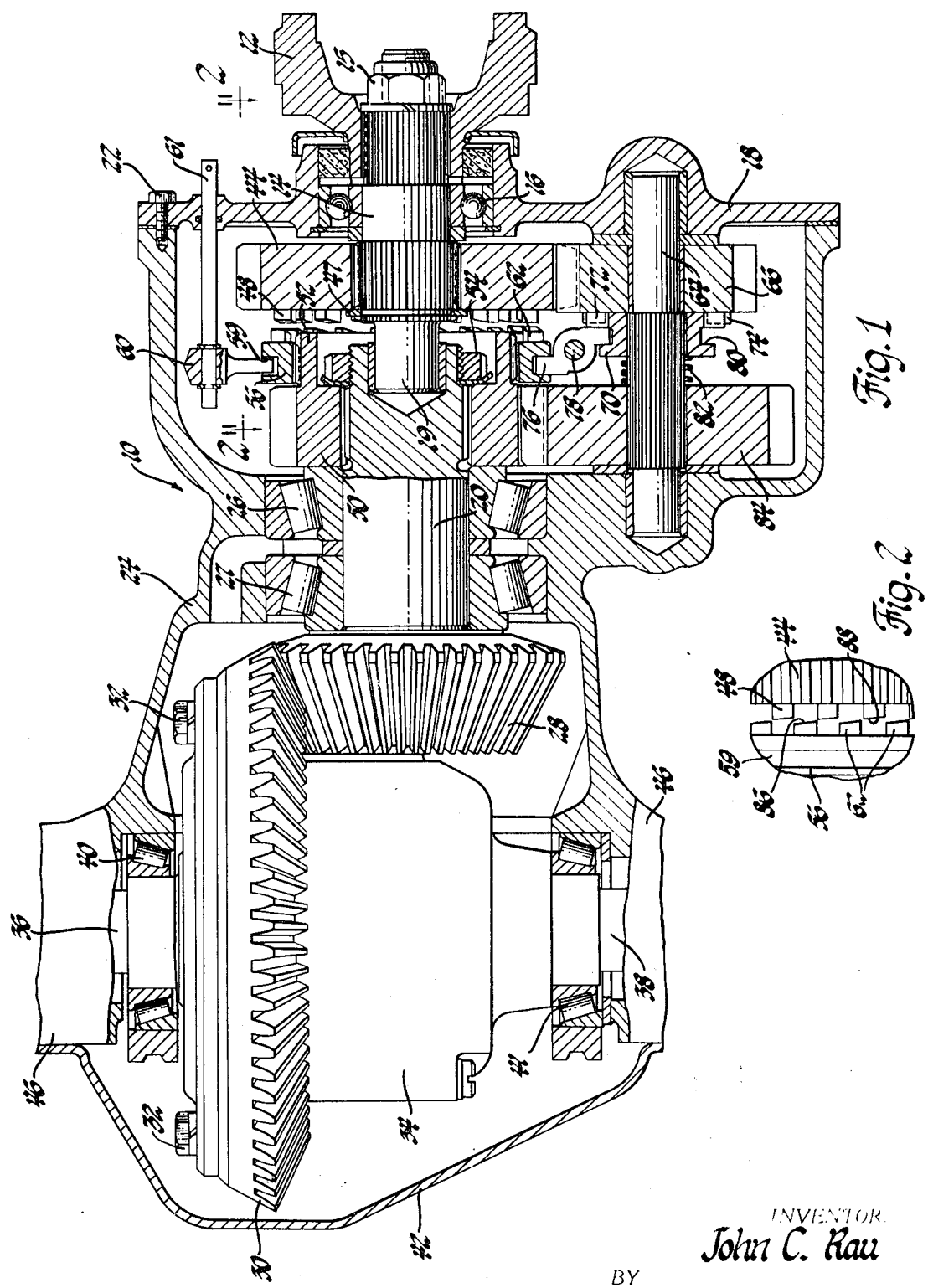

CHANGE-SPEED DRIVE AXLE

This invention relates to drive axles and more particularly to a change speed drive axle having constant mesh change speed gears with provision for synchronized shifts and for quick change of the axle ratio.

Vehicles such as passenger cars, station wagons and light trucks have been increasingly employed for hauling relatively large loads such as trailers, and campers. When such vehicles ascend a grade while hauling loads above normally recommended loads, a larger speed reduction gear ratio is often needed to provide the torque multiplication to allow the engine to effectively pull the load. Also in many cases it is highly desirable to provide an overdrive ratio in such vehicles to provide for highly efficient vehicle cruising such as in turnpike driving. Prior to the present invention special transmissions and auxiliary gear boxes have been employed to provide overdrive gear ratios for an economical cruising and to provide a low-speed gear ratio to meet added load requirements. These transmissions have not been widely employed due to their additional expense because of complex gearing and controls.

With this invention a two-speed drive axle is employed which is economical in construction and which provides multiplication of transmission input/output speed ratios to meet varying load requirements. For hauling large loads, using passenger cars and light trucks, a reduction ratio and a direct drive ratio are employed in the drive axles. For highly efficient cruising, an overdrive ratio could be substituted for the reduction ratio. In this invention the shift between the gear ratios is synchronized thereby eliminating gear clash and improving performance and durability of the gearing.

In the preferred embodiment there if a two-speed axle having front and rear pairs of constantly meshing gears. The front gears are readily accessible by removing the front cover from the axle so that they can be readily replaced by other gears. The gears of this axle are all rotating when the input is driven and there is a lever that interconnects shift collars so that one drive ratio is disconnected from the drive as the other is being connected. Special dog teeth are employed to provide for synchronized clutching with the front faces of the teeth inclined so that the clutch teeth will ratchet until a substantially synchronized condition is obtained between the parts being clutched together. The teeth have inclined side faces so that clutch teeth engagement will be maintained under load conditions. In the preferred embodiment a spring engages a shift collar in one direction to effect clutching of a pair of gears so that the power will flow to the differential through the countershaft. A suitable control extends through the transmission case to a first shift collar to provide a mechanism for selecting the gear ratios.

These and other features, objects and advantages will become more apparent from the following detailed description and drawings in which:

FIG. 1 is a top plan view of a drive axle partly in section with parts broken away.

FIG. 2 is a view taken along line 2—2 of FIG. 1.

As shown in FIG. 1 there is a drive axle 10 having a rotatable input provided by a companion flange 12 which is splined to one end of a drive shaft 14 and held thereon by nut 15. Drive shaft 14 is rotatably mounted by bearing 16 in the cover plate 18 and has a projecting end portion 19 of reduced diameter which is piloted into the end of pinion shaft 20. The cover plate 18 is removably secured by bolts 22 to the axle housing 24. The pinion shaft 20 is rotatably mounted in the housing by bearings 26 and 27 and is drivingly connected to a drive pinion 28. The drive pinion meshes with a ring gear 30 which is drivingly connected by bolts 32 to a differential case 34. The differential case contains conventional differential gearing including side gears, which are similar to that illustrated in FIG. 1 of U.S. Pat. No. 2,142,575 to A. R. Spicacci, that drive the axle shafts 36 and 38 which are rotatably mounted in the housing 24 by side bearings 40 and 41. As shown the axle housing in the area of the ring gear is closed by a cover 42 which is suitably affixed to axially extending portions 46 of the housing by bolts or other fastener means, not shown.

In this construction there is an input gear 44 splined to the drive shaft 14 and held thereon by snap ring 47. Input gear 44 has at one side an annular ring of dog teeth 48 formed thereon which extend axially toward a gear 50 splined to the pinion shaft 20. Gear 50 contacts the inner race of the bearing 26 and has a forwardly projecting annular shoulder 52 which is recessed to receive the lock nut 54 that is threadedly fastened on the forward end of pinion shaft 20 to retain gear 50 in position on this shaft.

The shoulder 52 has external splines on which an internally splined and axially shiftable collar 56 is mounted. This collar has an annular groove 59 which receives the working end of a shift control 60 having a control rod 61 extending through cover plate 18 and is mounted for longitudinal movement in housing 24.

The shift collar 56 also has a ring of forwardly projecting dog teeth 62 which can be moved into and out of meshing engagement with the dog teeth 48 of gear 44 by appropriate longitudinal movement of control rod 61 and the resulting movement of the shift collar 56.

The drive axle also has a countershaft 64 rotatably mounted in the housing 24 and this shaft rotatably supports a counter gear 66 which is in constant mesh with the input gear 44 and which has a smaller pitch diameter than gear 44 to provide an overdrive ratio. If desired, gears 66 and 44 could be replaced by another pair of gears after cover 18 is removed to provide for a speed reducing gear ratio to further increase transmission torques. Rearwardly of the counter gear 66 is a shiftable collar 70 splined to the countershaft 64. This collar has an annular arrangement of dog teeth 72 which can be moved into and out of mesh with the dog teeth 74 on gear 66 to clutch and unclutch the gear 66 to the countershaft 64. A lever 76 pivotally supported intermediate its ends on the housing 24 by pivot pin 78 operatively interconnects the shift collars 56 and 70. As shown, the lever has one arm disposed in the groove 59 of collar 56 and the other arm disposed in the groove 80 of collar 70 so that axial movement of one collar in one direction will produce axial movement of the other collar in an opposite direction.

There is a coil spring 82 disposed around the countershaft and seated on a transfer gear 84 for urging the collar 70 toward gear 66 so that dog teeth 72 and 74 will mesh to thereby drivingly connect gear 66 with countershaft 64. The transfer gear 84 is splined to the countershaft 64 and meshes with gear 50 to provide a power path from countershaft into the drive pinion. Preferably, gears 84 and 50 have equal pitch diameters.

As illustrated in FIG. 2, the dog teeth on the collar 56 and on the input gear 44 preferably have inclined front faces 86 and 88 respectively providing a sliding angle so that the dog teeth, when being engaged, will slide past each other until the originally slower part begins to overrun the originally faster part. When this happens, the teeth can be moved into meshing engagement. The teeth also preferably have slightly flaring side faces of 2°, for example, to help retain the teeth in meshing engagement while under load. The dog teeth 72 and 74 of collar 70 and gear 66 are the same as those illustrated in FIG. 2 to also provide for synchronized shifting between collar 70 and gear 66.

In operation for a direct drive between the input flange 12 and the drive pinion 28 the control lever 60 is turned counterclockwise by the operator member to slide collar 56 toward gear 44. The inclined faces of the dog teeth permit clutching of the dog teeth with minimized clash. The lever at this time moves the collar 70 away from gear 66 so that the dog teeth 72 and 74 disengage. The gear 66 will still be driven by gear 44 but no power will flow into the countershaft. The power path will be from companion flange 12 through the engaged dog teeth 62 and 48 and through drive pinion shaft 20 to the drive pinion 28. For overdrive the control lever is returned to the FIG. 1 position and dog teeth 48 and 62 disengage and dog teeth 72 and 74 engage by action of the lever and spring 82. The outer faces of the dog teeth are inclined at 86 and 88 providing ramps to facilitate engagement.

From the above, it will be appreciated that the gears of the two-speed axle are in constant mesh and that the shifting is substantially synchronized. Since the gears 44 and 66 are readily accessible, they can be replaced by speed-reducing gears after dropping the propeller shaft and removing the forward components of the axle including the companion flange cover plate 18.

This invention is not limited to the details of the construction shown and described for purposes of illustrating the invention for other modifications will occur to those skilled in the art.

What is claimed is:

1. A change speed drive axle comprising input means and output means, a housing having an access opening at one end thereof, a cover plate for said access opening, a drive shaft drivingly connected to said input means and rotatably mounted in said housing, an input gear mounted on said drive shaft within said housing adjacent to said cover plate, connecting means for drivingly securing said input gear to said drive shaft, a countershaft, a first gear disposed within said housing adjacent to said cover plate rotatably mounted on said countershaft and constantly meshing with said input gear, torque-transmitting means mounted in said housing drivingly connected to said output means, a transfer gearset drivingly connecting said torque-transmitting means to said countershaft, selectively engageable first clutching means operatively disposed between said input gear and said torque-transmitting means and movable in a first direction to clutch said input gear and said drive shaft directly to said torque-transmitting means to provide a first speed ratio, second clutching means disposed between said first gear and said countershaft movable in said first direction for clutching said first gear and said countershaft to said input means to said torque-transmitting means through said countershaft and thereby provide a second speed ratio when said first clutching means is disengaged, and fastener means removably securing said cover plate to said housing to facilitate removal of said cover plate to provide access to said input gear and said first gear.

2. In a change speed drive axle comprising an input, first and second output shafts, a housing having an access opening and having a removable cover plate for covering said access opening, power transmission means operatively disposed in said housing for connecting said input to said output shafts, said power transmission means comprising: first gear means splined to said input, a rotatable countershaft mounted in said housing and rotatably supported by said cover plate having a change speed gear rotatably mounted thereon constantly meshing with said first gear means, said first gear means and said change speed gear being disposed in said housing adjacent to said cover plate, a differential having an input member and having first and second output members drivingly connected to said first and second output shafts, transfer gear means drivingly connecting said countershaft to said differential input member, first clutch means for connecting and disconnecting said first gear means and thereby said input directly to said differential input member and engageable for the transmittal of power directly from said input to said differential, and second selectively engageable clutch means for selectively connecting said change speed gear and said countershaft to effect a speed change in the input/output speed ratio of said axle.

3. In a change speed drive axle comprising a housing, said housing having a removable cover plate closing an access opening therein, an input member extending into said housing through said cover plate, first and second output axles, an input gear disposed in said housing adjacent to said cover plate drivingly connected to said input member, a countershaft in said housing having one end mounted in said cover plate, a countershaft gear disposed in said housing adjacent to said cover plate in constant mesh with said input gear mounted for freewheeling rotation on said countershaft, a transfer gear fixed to said countershaft for rotation therewith, a differential unit having an input ring gear and having output means drivingly connected to said first and second output axles, a drive pinion meshing with said ring gear, a drive shaft mounted in said housing drivingly connected to said pinion, a drive gear secured for rotation with said drive shaft in constant mesh with said transfer gear, said drive gear having a splined shoulder, a longitudinally movable shift collar slidably mounted on said shoulder, said shift collar having clutching teeth projecting from one side thereof, said rotating input gear having clutching teeth projecting from one side thereof for meshing with the teeth of said collar to provide synchronized first clutching means to drivingly connect said input to said pinion, a longitudinally movable second collar shiftably mounted on said countershaft having clutching teeth projecting from one side therefrom, said countershaft gear having clutching teeth for meshing with the teeth of said collar to provide a synchronized second clutching means so that said countershaft gear is drivingly connected to said countershaft, and lever means operatively connecting said collars so that the movement of one of said collars to cause the synchronized engagement of one of said clutching means effects movement of the other of said collars to cause the disengagement of the other of said clutching means.

4. A power transmission comprising in combination, an input member and first and second outputs, a housing having an access opening at one end thereof, a cover plate removably secured to said housing for closing said access opening, said cover plate having an opening to permit said input member to extend into said housing, a differential disposed in said housing having a ring gear and having power transmission means driven by said ring gear operatively connected to each of said outputs, a pinion drivingly meshing with said ring gear having a drive shaft rotatably supporting one end of said input member, a countershaft disposed in said housing parallel to said input member having one end mounted in said cover plate, a first gearset disposed in said housing adjacent to said access opening and said cover plate including an input gear splined to said input member and a second gear rotatably mounted on said countershaft which constantly meshes with said input gear, first clutch means including a movable sleeve operatively disposed between said drive shaft and said input member engageable to drivingly connect said input gear and said input member to said drive shaft so that said input member can drive said pinion at the speed of said input member, a second clutch means for drivingly connecting and disconnecting said second gear and said countershaft, a second gearset having one gear mounted on said countershaft and another gear mounted on said drive shaft for drivingly connecting said input gear to said drive shaft, said second clutch means including a sleeve splined to said countershaft and slidably mounted thereon, said last-mentioned sleeve having positive clutching teeth drivingly engageable with said second gear, and a lever operatively interconnecting said sleeves so that movement of one of said sleeves to effect engagement of the associated clutch will effect disengagement of the other of said clutches to permit said input to drive said pinion at a predetermined speed.

5. The power transmission defined in claim 4 wherein said first mentioned sleeve and said input gear have axially projecting positive clutching teeth for drivingly coupling said input gear to said drive shaft when engaged and wherein said second mentioned sleeve and said second gear have axially projecting clutching teeth for drivingly coupling said input gear to said countershaft when engaged, and spring means disposed around said countershaft for effecting engagement of said second clutch means and the disengagement of said first clutch means.

* * * * *